(12) United States Patent
Morita

(10) Patent No.: US 9,888,511 B2
(45) Date of Patent: *Feb. 6, 2018

(54) MOBILE COMMUNICATION SYSTEM, BASE STATION, USER TERMINAL AND PROCESSOR

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/199,348

(22) Filed: Jun. 30, 2016

(65) Prior Publication Data

US 2016/0316505 A1    Oct. 27, 2016

Related U.S. Application Data

(63) Continuation of application No. 14/767,242, filed as application No. PCT/JP2014/053741 on Feb. 18, 2014.

(Continued)

(51) Int. Cl.
*H04W 76/02* (2009.01)
*H04W 8/00* (2009.01)
(Continued)

(52) U.S. Cl.
CPC ......... *H04W 76/023* (2013.01); *H04W 8/005* (2013.01); *H04W 52/383* (2013.01);
(Continued)

(58) Field of Classification Search
CPC . H04W 76/023; H04W 8/005; H04W 52/383; H04W 40/10; H04W 52/00;
(Continued)

(56) References Cited

U.S. PATENT DOCUMENTS

2009/0011770 A1    1/2009 Jung et al.
2009/0325625 A1   12/2009 Hugl et al.
(Continued)

FOREIGN PATENT DOCUMENTS

JP    2009-17560 A    1/2009
JP    2012-124856 A   6/2012
(Continued)

OTHER PUBLICATIONS

3rd Generation Partnership Project; Technical Specification Group Services and System Aspects; Feasibility study for Proximity Services (ProSe) (Release 12); pp. 1-40.
(Continued)

*Primary Examiner* — Romani Ohri
(74) *Attorney, Agent, or Firm* — Studebaker & Brackett PC

(57) ABSTRACT

A mobile communication system according to the present disclosure supports cellular communication in which a data path passes through a core network and D2D communication that is direct device-to-device communication in which a data path does not pass through the core network. The mobile communication system has a user terminal that performs a process of discovering a partner terminal in the D2D communication or performs the D2D communication. A plurality of radio resources that are the time-frequency resources that can be used for the process of discovering or the D2D communication consist of radio resources associated with transmission power used for the process of discovering or the D2D communication. The user terminal performs the process of discovering or the D2D communication on the basis of the transmission power associated with the radio resource used by the user terminal.

4 Claims, 14 Drawing Sheets

Related U.S. Application Data

(60) Provisional application No. 61/766,505, filed on Feb. 19, 2013.

(51) Int. Cl.
    *H04W 52/38*     (2009.01)
    *H04W 72/04*     (2009.01)
    *H04W 72/02*     (2009.01)
    *H04W 92/18*     (2009.01)
    *H04W 52/36*     (2009.01)

(52) U.S. Cl.
CPC ......... *H04W 72/02* (2013.01); *H04W 72/044* (2013.01); *H04W 72/0446* (2013.01); *H04W 72/0453* (2013.01); *H04W 52/367* (2013.01); *H04W 92/18* (2013.01)

(58) Field of Classification Search
CPC . H04W 52/367; H04W 72/005; H04W 72/04; H04W 67/1061
See application file for complete search history.

(56) References Cited

U.S. PATENT DOCUMENTS

| | | | | |
|---|---|---|---|---|
| 2011/0268101 A1* | 11/2011 | Wang | ................... | H04L 5/0053 370/344 |
| 2012/0051315 A1 | 3/2012 | Wang et al. | | |
| 2014/0003262 A1* | 1/2014 | He | ........................ | H04W 28/08 370/252 |
| 2014/0079052 A1 | 3/2014 | Senoo | | |
| 2014/0094162 A1* | 4/2014 | Heo | ................... | H04W 52/0258 455/422.1 |
| 2014/0187283 A1* | 7/2014 | Nimbalker | .......... | H04W 72/048 455/550.1 |
| 2015/0245192 A1* | 8/2015 | Wu | ....................... | H04W 8/005 370/329 |

FOREIGN PATENT DOCUMENTS

| | | |
|---|---|---|
| WO | 2011/143496 A1 | 11/2011 |
| WO | 2012/172628 A1 | 12/2012 |

OTHER PUBLICATIONS

International Search Report for PCT/JP2014/053741 dated Mar. 18, 2014.

The extended European search report issued by the European Patent Office dated Sep. 6, 2016, which corresponds to European Patent Application No. 14754764.0-1855 and is related to U.S. Appl. No. 15/199,348.

Ang-Hsun Tsai et al.; "Intelligent resource management for device-to-device (D2D) communications in heterogeneous networks"; Wireless Personal Multimedia Communciations, 2012—15th International Symposium on IEEE; Sep. 24, 2012; pp. 75-79.

\* cited by examiner

| f0 | TxPwrMax0 | TxPwrUp Thresh0 | TxPwrDn Thresh0 | fup0 | fdown0 |
| f1 | TxPwrMax1 | TxPwrUp Thresh1 | TxPwrDn Thresh1 | fup1 | fdown1 |
| fn | TxPwrMaxn | TxPwrUp Threshn | TxPwrDn Threshn | fupn | fdownn |

FIG. 14

| f0 | TxPwrMax0 | TxPwrMin0 |
|----|-----------|-----------|
| f1 | TxPwrMax1 | TxPwrMin1 |
| fn | TxPwrMaxn | TxPwrMinn |

FIG. 16

| | TxPwrMax | TxPwrUp Thresh | TxPwrDn Thresh | fup | fdown | PLup | PLdn |
|---|---|---|---|---|---|---|---|
| f0 | TxPwrMax0 | TxPwrUp Thresh0 | TxPwrDn Thresh0 | fup0 | fdown0 | PLup0 | PLdn0 |
| f1 | TxPwrMax1 | TxPwrUp Thresh1 | TxPwrDn Thresh1 | fup1 | fdown1 | PLup1 | PLdn1 |
| fn | TxPwrMaxn | TxPwrUp Threshn | TxPwrDn Threshn | | | | |

MOBILE COMMUNICATION SYSTEM, BASE STATION, USER TERMINAL AND PROCESSOR

TECHNICAL FIELD

The present disclosure relates to a mobile communication system that supports D2D communication, a base station, a user terminal, and a processor.

BACKGROUND ART

In 3GPP (3rd Generation Partnership Project) which is a project aiming to standardize a mobile communication system, the introduction of Device to Device (D2D) communication is discussed as a new function after Release (see Non Patent Document 1).

In the D2D communication, a plurality of neighboring user terminals (a user terminal group) perform direct communication without passing through a core network. That is, a data path of the D2D communication does not pass through the core network. On the other hand, a data path of normal communication (cellular communication) of a mobile communication system passes through the core network.

Further, in order to perform the D2D communication, a user terminal performs a process of discovering a partner terminal in the D2D communication. The user terminal transmits a discovery-use signal for discovering the partner terminal (or for being discovered by the partner terminal) so as to discover the partner terminal. The user terminal having discovered the partner terminal starts the D2D communication with the partner terminal.

PRIOR ART DOCUMENT

Non-Patent Document

[Non Patent Document 1] 3GPP technical report "TR 22.803 V12.0.0" December 2012

SUMMARY

Currently, there is no mechanism for appropriately controlling transmission power used for the D2D communication. Thus, when a user terminal freely sets the transmission power, the user terminal that performs the D2D communication may apply interference to another user terminal existing in surroundings thereof or a base station.

Further, also with respect to transmission power in the process of discovering the partner terminal in the D2D communication, as in the case of the transmission power used for the D2D communication, there is no mechanism for appropriately controlling the transmission power used for the process of discovering. Therefore, the user terminal that transmits the discovery-use signal may apply interference.

Therefore, the present disclosure provides a mobile communication system capable of appropriately controlling transmission power used for a process of discovering a partner terminal in D2D communication or for the D2D communication, a base station thereof, a user terminal thereof, and a processor thereof.

According to an embodiment, a user terminal comprises: a receiver configured to receive a System Information Brock (SIB) from a base station; and a transmitter configured to transmit a discovery signal for discovering another user terminal in a discovery procedure, wherein the SIB includes first information and second information. The first information is information for controlling transmission power of the discovery signal. The first information is information associated with each of a plurality of radio resources including time-frequency region available for the discovery procedure. The second information is information for specifying each of the plurality of radio resources, and the transmitter is configured to directly transmit the discovery signal to another user terminal with transmission power based on the first information.

According to an embodiment, a processor for controlling a user terminal is configured to: perform a process of receiving a System Information Brock (SIB) from a base station; and perform a process of transmitting a discovery signal for discovering another user terminal in a discovery procedure, wherein the SIB includes first information and second information. The first information is information for controlling transmission power of the discovery signal. The first information is information associated with each of a plurality of radio resources including time-frequency region available for the discovery procedure. The second information is information for specifying each of the plurality of radio resources, and the processor is configured to perform a process of directly transmitting the discovery signal to another user terminal with transmission power based on the first information.

According to an embodiment, a base station comprises: a controller configured to include first information and second information into the SIB; and a transmitter configured to transmit a System Information Brock (SIB), wherein the first information is information for controlling transmission power of the discovery signal. The first information is information associated with each of a plurality of radio resources including time-frequency region available for the discovery procedure, and the second information is information for specifying each of the plurality of radio resources.

According to an embodiment, a processor configured for controlling a base station is configured to: perform a process of including first information and second information into the SIB; and perform a process of transmitting a System Information Brock (SIB), wherein the first information is information for controlling transmission power of the discovery signal. The first information is information associated with each of a plurality of radio resources including time-frequency region available for the discovery procedure, and the second information is information for specifying each of the plurality of radio resources.

BRIEF DESCRIPTION OF THE DRAWINGS

FIG. 14 is a transmission power control table showing association of a subcarrier used for the D2D communication with transmission power used for the D2D communication according to the present modification of the first embodiment.

FIG. 16 is a transmission power control table showing association of a subcarrier used for the D2D communication with transmission power used for the D2D communication according to a second embodiment.

MODE FOR CARRYING OUT THE DISCLOSURE

[Overview of Embodiment]

Figure 1:
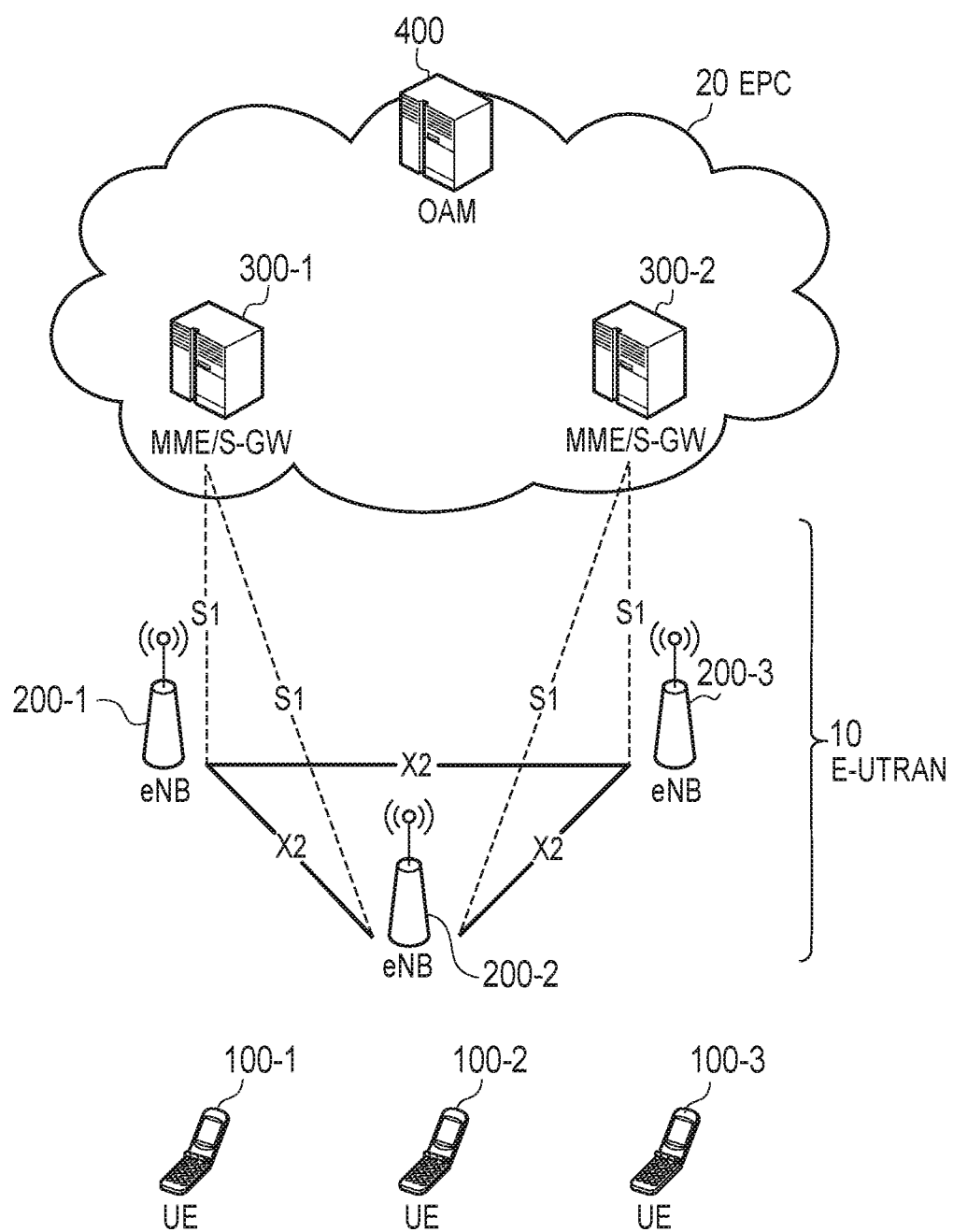
FIG. 1 is a configuration diagram of an LTE system.

A mobile communication system according to an embodiment supports cellular communication in which a data path passes through a core network and D2D communication that is direct device-to-device communication in which a data path does not pass through the core network. The mobile communication system has a user terminal that performs a process of discovering a partner terminal in the D2D communication or performs the D2D communication. A plurality of radio resources that are the time-frequency resources that can be used for the process of discovering or the D2D communication consist of radio resources associated with transmission power used for the process of discovering or the D2D communication. The user terminal performs the process of discovering or the D2D communication on the basis of the transmission power associated with the radio resource used by the user terminal. As a result, the transmission power used for process of discovering or D2D communication is limited due to the radio resources used by user terminal, thereby making it possible to appropriately control the transmission power.

A mobile communication system according to a first embodiment and a second embodiment has a base station that control the cell in which the user terminal exists. The base station transmits, to the user terminal, transmission power control information indicating the plurality of radio resources and the transmission power associated with each of the plurality of radio resources. The user terminal selects the radio resource used for the process of discovering or the D2D communication from the plurality of radio resources on the basis of the transmission power control information. As a result, base station can control transmission power selected by user terminal on the basis of transmission power control information.

In the first embodiment and the second embodiment, the transmission power associated with each of the plurality of radio resource indicates a range of the transmission power. The user terminal, on the basis of the transmission power control information, selects the radio resource from the plurality of radio resources so that the used transmission power to be used for process of discovering or the D2D communication is within the range of the transmission power. As a result, user terminal can selects an appropriate radio resource on the basis of transmission power used for process of discovering or D2D communication.

In the first embodiment, the user terminal reselects the radio resource when changing the used transmission power. As a result, user terminal can perform process of discovering or D2D communication with an appropriate transmission power.

In the first embodiment, when the user terminal determining that the used transmission power is larger than any upper limit value of the transmission power associated with each of the plurality of radio resources on the basis of the transmission power control information, the user terminal transmits, to the base station, information requesting that the cellular communication is performed. As a result, when the transmission power of the D2D communication is so large as to apply interference, communication that passes through the base station is performed, and thus, occurrence of interference can be prevented.

In the second embodiment, the transmission power control information further includes information indicating a distance from the base station. The transmission power associated with each of the plurality of radio sources is associated with the distance from the base station so that the upper limit value of the transmission power becomes larger according to the distance from the base station. The user terminal selects the radio resource from the plurality of radio resources on the basis of the distance from the base station to the user terminal. As a result, user terminal selects radio resource so that the upper limit value of transmission power becomes larger according to the distance from base station, and thus, the user terminal can perform an appropriate process of discovering or D2D communication by taking the influence of interference to base station into consideration.

In the second embodiment, the information indicating the distance from the base station is information indicating the pass loss between the base station and the user terminal. As a result, user terminal can perform an appropriate process of discovering or D2D communication even if the user terminal does not know the direct distance between the user terminal and the base station.

In the third embodiment, the plurality of radio resources are the plurality of frequency bands divided in the frequency direction. The plurality of frequency bands are divided into high power frequency band associated with a transmission power in which an upper limit value of the transmission power is larger than a predetermined value and low power frequency band associated with a transmission power in which an upper limit value of the transmission power is equal to or less than the predetermined value. The low power frequency band is provided adjacent to cellular frequency band used only for the cellular communication. The high power frequency band is provided distant from the cellular frequency band. As a result, even in the case that D2D communication was performed by radio resource that is adjacent to (near) the frequency band used for cellular communication, since the transmission power of the D2D communication is small, it is possible to reduce the interference applied to the user terminal which performing D2D communication with the radio resource in the frequency band used only for cellular communication.

In other embodiment, the mobile communication system further comprising a base station that manages the cell in which the user terminal exists and a neighbor base station that manages a neighbor cell adjacent to the cell. Out of the plurality of radio resources, the radio resource that is available at the edge of the cell is different from the radio resource that is available at the edge of the neighbor cell. As a result, it is possible to prevent the occurrence of interference between the terminal group that performing D2D communication in cell and the terminal group that performing D2D communication in the neighbor cell.

A base station according to an embodiment is a base station in a mobile communication system that supports cellular communication in which a data path passes through a core network and D2D communication that is direct device-to-device communication in which a data path does not pass through the core network. The base station has a transmission unit configured to transmit transmission power control information including information on a plurality of radio resources that are the time-frequency resources that can be used for a process of discovering a partner terminal in the D2D communication or for the D2D communication and the information on transmission power associated with each of the plurality of radio resources.

A user terminal according to an embodiment is a user terminal in a mobile communication system that supports cellular communication in which a data path passes through a core network and D2D communication that is direct device-to-device communication in which a data path does not pass through the core network. The user terminal has a control unit configured to perform a process of discovering a partner terminal in the D2D communication or to perform the D2D communication. A plurality of radio resources that are the time-frequency resources that can be used for the process of discovering or the D2D communication consist of radio resources associated with transmission power used for the process of discovering or the D2D communication. The control unit performs the process of discovering or the D2D communication on the basis of transmission power associated with radio resource used by the user terminal.

A processor according to an embodiment is a processor provided in a base station in a mobile communication system that supports cellular communication in which a data path passes through a core network and D2D communication that is direct device-to-device communication in which a data path does not pass through the core network. The processor executes a process of transmitting, to a user terminal, transmission power control information including information on a plurality of radio resources that are the time-frequency resources that can be used for a process of discovering a partner terminal in the D2D communication or for the D2D communication and the information on transmission power associated with each of the plurality of radio resources.

A processor according to an embodiment is a processor provided in a user terminal in a mobile communication system that supports cellular communication in which a data path passes through a core network and D2D communication that is direct device-to-device communication in which a data path does not pass through the core network. The processor executes a process of performing a process of discovering a partner terminal in the D2D communication or performing the D2D communication. A plurality of radio resources that are the time-frequency resources that can be used for the process of discovering or the D2D communication consist of radio resources associated with transmission power used for the process of discovering or the D2D communication. The processor executes a process of performing the process of discovering or the D2D communication on the basis of transmission power associated with radio resource used by the user terminal.

Hereinafter, with reference to the accompanying drawings, the description will be provided for each embodiment when D2D communication is introduced to a cellular mobile communication system (hereinafter, an "LTE system") configured according to the 3GPP standards.

[First Embodiment]

Hereinafter, the first embodiment will be described.

(LTE system)

FIG. 1 is a configuration diagram of an LTE system according to the present embodiment.

As illustrated in FIG. 1, the LTE system includes a plurality of UEs (User Equipments) 100, E-UTRAN (Evolved-Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). Each eNB 200 corresponds to a base station. The eNB 200 manages a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes MME (Mobility Management Entity)/S-GWs (Serving-Gateways) 300, and OAM 400 (Operation and Maintenance). Further, the EPC 20 corresponds to a core network.

The MME is a network node that performs various mobility controls and the like, for the UE 100 and corresponds to a controller. The S-GW is a network node that performs control to transfer user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
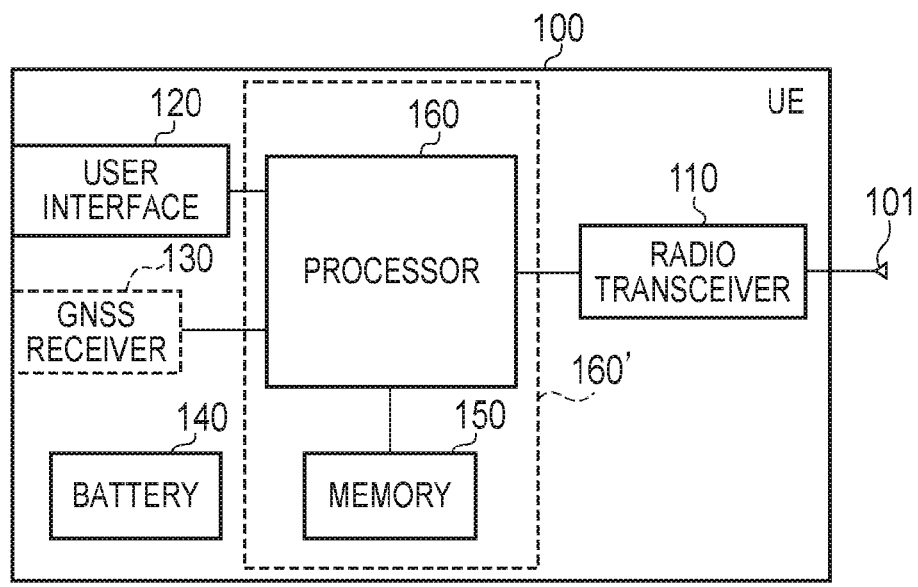
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
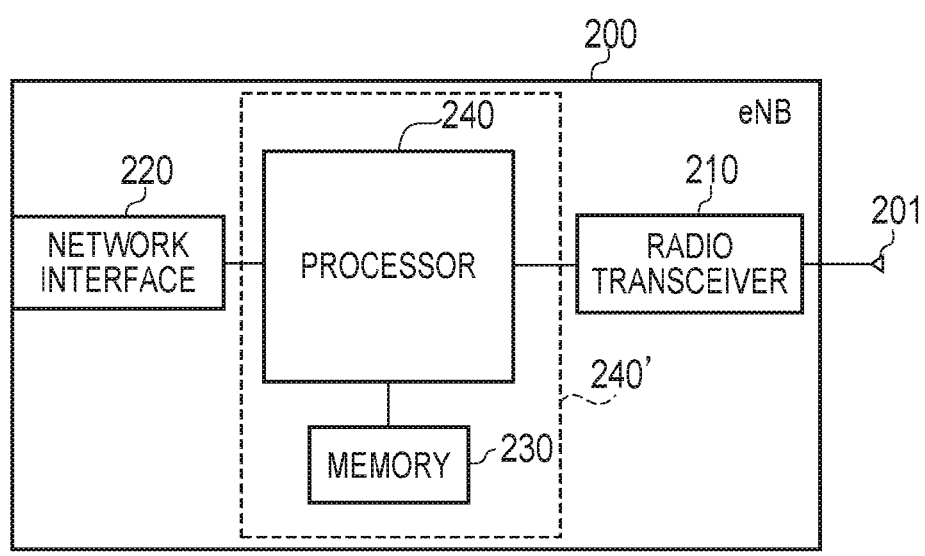
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. In addition, the memory 230 is integrated with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
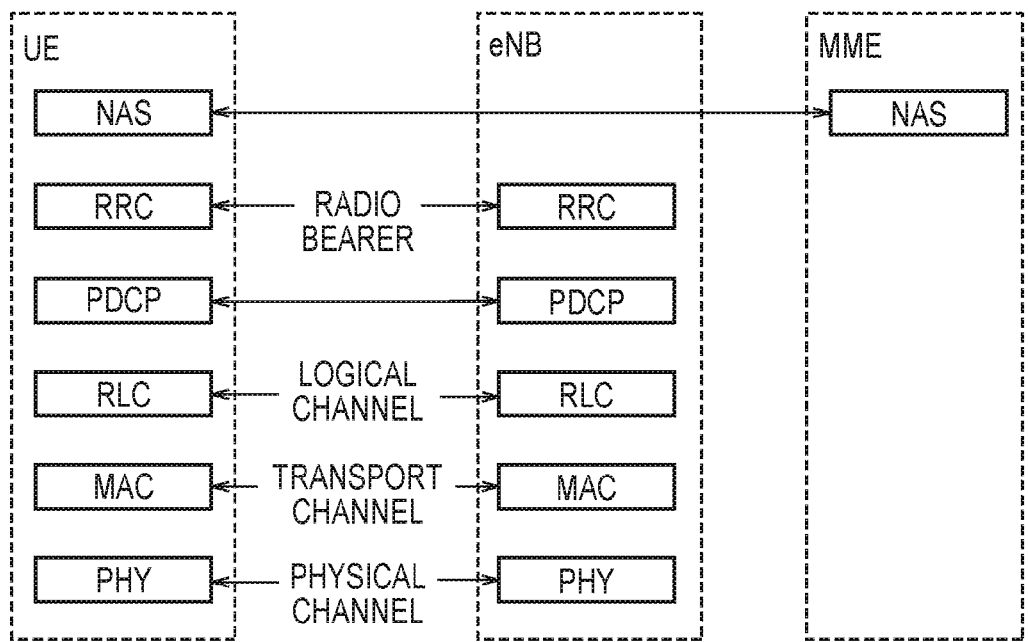
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler to decide a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management and mobility management, for example.

Figure 5:
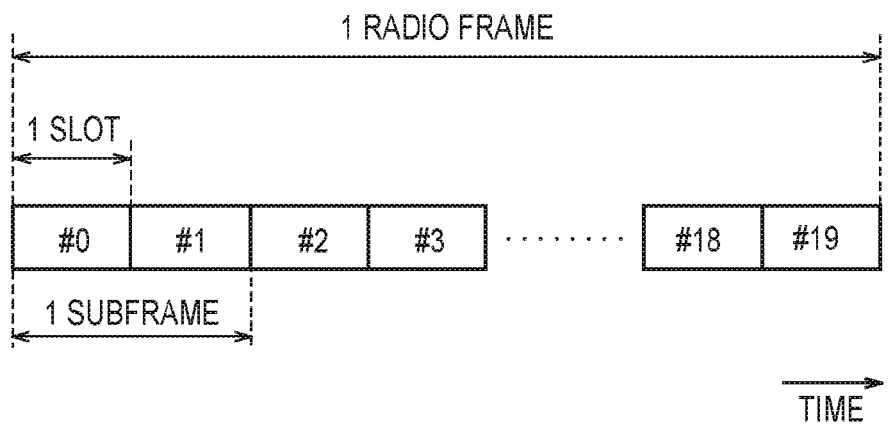
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region that can be mainly used as a physical uplink shared channel (PUSCH). Moreover, in each subframe, a demodulation reference signal (DMRS) and a sounding reference signal (SRS) are arranged.

(D2D Communication)

Next, description will be provided by comparing the D2D communication with the normal communication (the cellular communication) in the LTE system.

Figure 6:
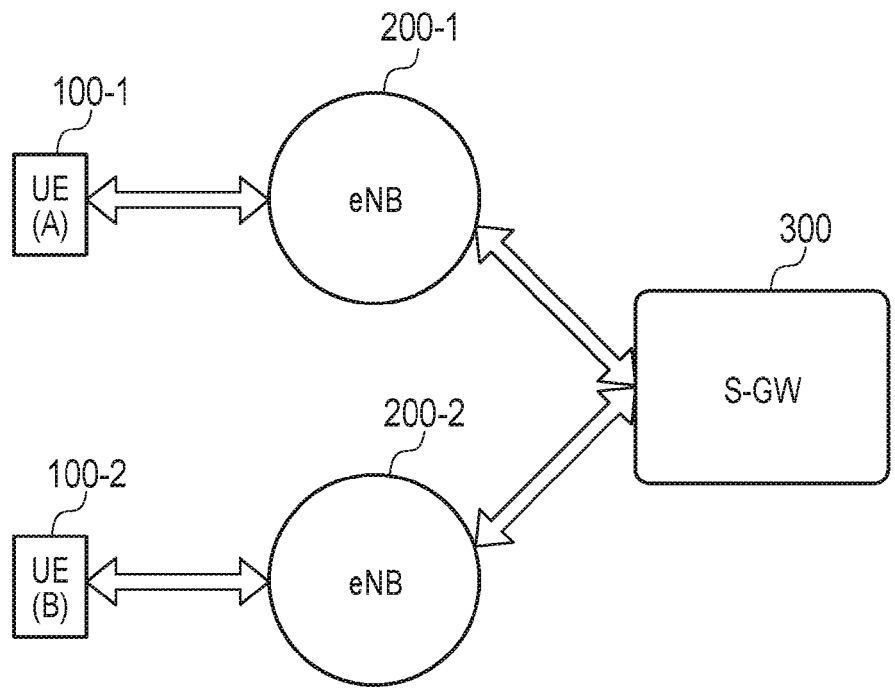
FIG. 6 is a diagram illustrating a data path in cellular communication.

FIG. 6 is a diagram illustrating a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the core network. Specifically, the data path is set to pass through the eNB 200-1, the S-GW 300, and the eNB 200-2.

Figure 7:
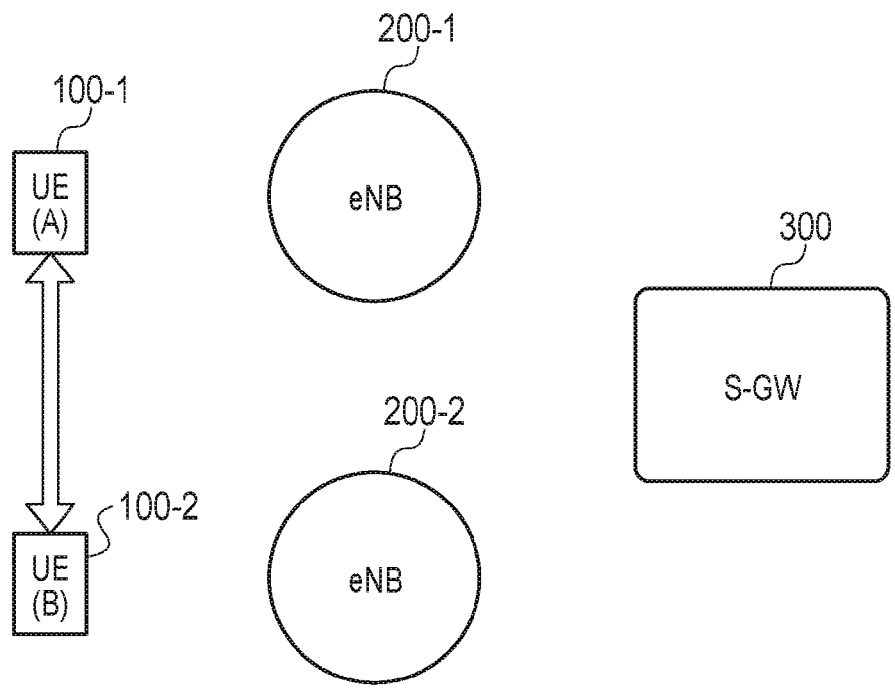
FIG. 7 is a diagram illustrating a data path in D2D communication.

FIG. 7 is a diagram illustrating a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the core network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. In addition, in a mode called Locally Routed (locally routed mode), a data path passes through the eNB 200 without passing through the S-GW 300.

It is noted that cases in which the D2D communication is started include (a) a case in which the D2D communication is started after a partner terminal (proximal terminal) is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the vicinity of the one UE 100, so that the D2D communication is started.

In such a case, in order to discover the partner terminal, the UE 100 has a (Discover) function of discovering another UE 100 (proximal terminal) existing in the vicinity of the UE 100, and/or a (Discoverable) function of being discovered by another UE 100.

Specifically, the UE100-1 transmits a discovery signal (Discovery signal/Discoverable signal) indicates a signal for discovering the partner terminal (proximal terminal) or a signal that is used to be discovered from the partner terminal (proximal terminal). The UE 100-2 which received the discovery signal discovers the UE 100-1. When the UE 100-2 transmits a response to the discovery signal, the UE 100-1 that has transmitted the discovery signal discovers the UE 100-2, which is the partner terminal.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. Additionally, the UE 100-1 may report the discovery of the proximal UE 100 (that is, the UE 100-2) to an upper layer (e.g. application, etc.), if the UE 100-1 did not perform the D2D communication after discovering the partner terminal. For example, the application executes the process (e.g. process of plotting the location of the UE 100-2 to the map information) based on the report.

Furthermore, the UE 100 may report the eNB 200 that the partner terminal has been discovered and may receive an instruction from the eNB 200 indicate the commutation with the partner terminal is performed in cellular communication or in the D2D communication.

On the other hand, in the above-described case (b), for example, the UE 100-1 starts the transmission (such as a notification through broadcasting) of a signal for the D2D communication without specifying a partner terminal. Thus, the UE 100 is capable of starting the D2D communication regardless of the existence of the discovery of a partner terminal. It is noted that the UE 100-2 that is performing the standby operation for the signal for the D2D communication performs synchronization or/and demodulation on the basis of the signal from the UE 100-1.

(Transmission Power Control Information)

Next, transmission power control information according to the present embodiment will be described by using FIG. 8 and FIG. 9.

Figures 8, 9:
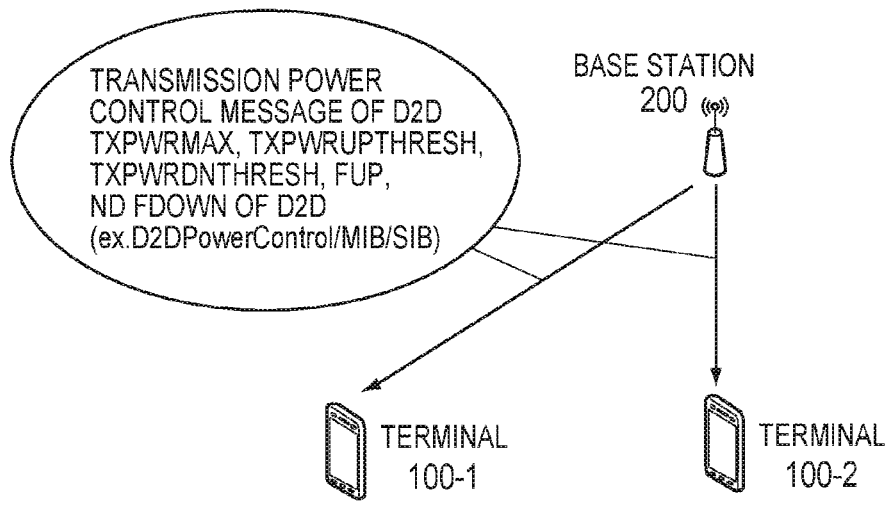
FIG. 8 is a diagram for explaining transmission and reception of transmission power control information.
FIG. 9 is a transmission power control table showing association of a subcarrier used for the D2D communication with transmission power used for the D2D communication.

FIG. 8 is a diagram for explaining transmission and reception of transmission power control information according to the first embodiment. FIG. 9 is a transmission power control table showing association of a subcarrier used for the D2D communication with transmission power used for the D2D communication.

The plurality of radio resources which are the time-frequency resources that can be used for the discovery process or the D2D communication consist of the radio resources associated with the transmission power used for the discovery process or the D2D communication. The transmission power control information is information indicating the plurality of radio resources and the transmission power associated with each of the plurality of radio resources, and specifically, is as described in the transmission power control table shown in FIG. 9.

As shown in FIG. 8, the eNB 200 transmits, to the UE 100-1 and the UE 100-2, a transmission power control message including the transmission power control information. The UE 100-1 and the UE 100-2 receive the transmission power control message. Each of the UE 100-1 and the UE 100-2 performs the discovery process on the basis of the transmission power associated with the radio resource used for the discovery process. Further, each of the UE 100-1 and the UE 100-2 performs the D2D communication on the basis of the transmission power associated with the radio resource used for the D2D communication.

In the present embodiment, a frequency band used for the D2D communication is divided into a plurality of subcarriers (plurality of radio resource). Each of the plurality of subcarriers used for the D2D communication is associated with the transmission power used for the discovery process or the D2D communication.

Specifically, as shown in FIG. 8 and FIG. 9, each of the plurality of subcarriers (f0, f1, . . . fn) is associated with a maximum value (TxPwrMax0, TxPwrMax1, . . . , TxPwrMaxn) of the transmission power used for the D2D communication, an upper limit value (TxPwrUpThresh0, TxPwrUpThresh1, . . . , TxPwrUpThreshn) of the transmission power used for the D2D communication, a lower limit value (TxPwrDnThresh0, TxPwrDnThresh1, . . . , TxPwrDnThreshn) of the transmission power used for the D2D communication, a subcarrier (fup0, fup1, . . . , fupn) of a change destination when the transmission power is equal to or larger than the upper limit value, and a subcarrier (fdown0, fdown1, . . . , fdownn) of a change destination when the transmission power is equal to or less than the lower limit value. It is noted that the upper limit value of the transmission power may be equal to the maximum value of the transmission power or larger than the maximum value of the transmission power.

Each of the plurality of subcarriers is associated with each of different upper limit values of the transmission power. Accordingly, for example, the upper limit value TxPwrUpThresh0 of the transmission power associated with the subcarrier f0 is smaller than the upper limit value TxPwrUpThresh1 of the transmission power associated with the subcarrier f1.

Further, each of the plurality of subcarriers is also associated with each of different lower limit values of the transmission power. Accordingly, for example, the lower limit value TxPwrDnThresh0 of the transmission power associated with the subcarrier f0 is smaller than the upper limit value TxPwrDnThresh1 of the transmission power associated with the subcarrier f1.

Each of the plurality of subcarriers is associated with the upper limit value and the lower limit value of the transmission power, and thus, each of the plurality of subcarriers is associated with the range of the transmission power.

As shown in FIG. 8, the eNB 200 transmits, to the UE 100-1 and the UE 100-2, the plurality of subcarriers (f) and information (TxPwrMax, TxPwrUpThresh, TxPwrDnThresh, fup, and fdown) associated with each of the plurality of subcarriers as shown in FIG. 9 as a transmission power control message of the D2D communication. The eNB 200 may transmit the transmission power control message of the D2D communication in a unicast manner by D2DPowerControl, or may transmit the transmission power control message in a broadcast manner by a master information block (MIB) or a system information block (SIB).

(Operation of Mobile Communication System According to First Embodiment)

Next, by using FIG. 10 to FIG. 13, an operation of a mobile communication system according to the first embodiment will be described.

Figure 10:
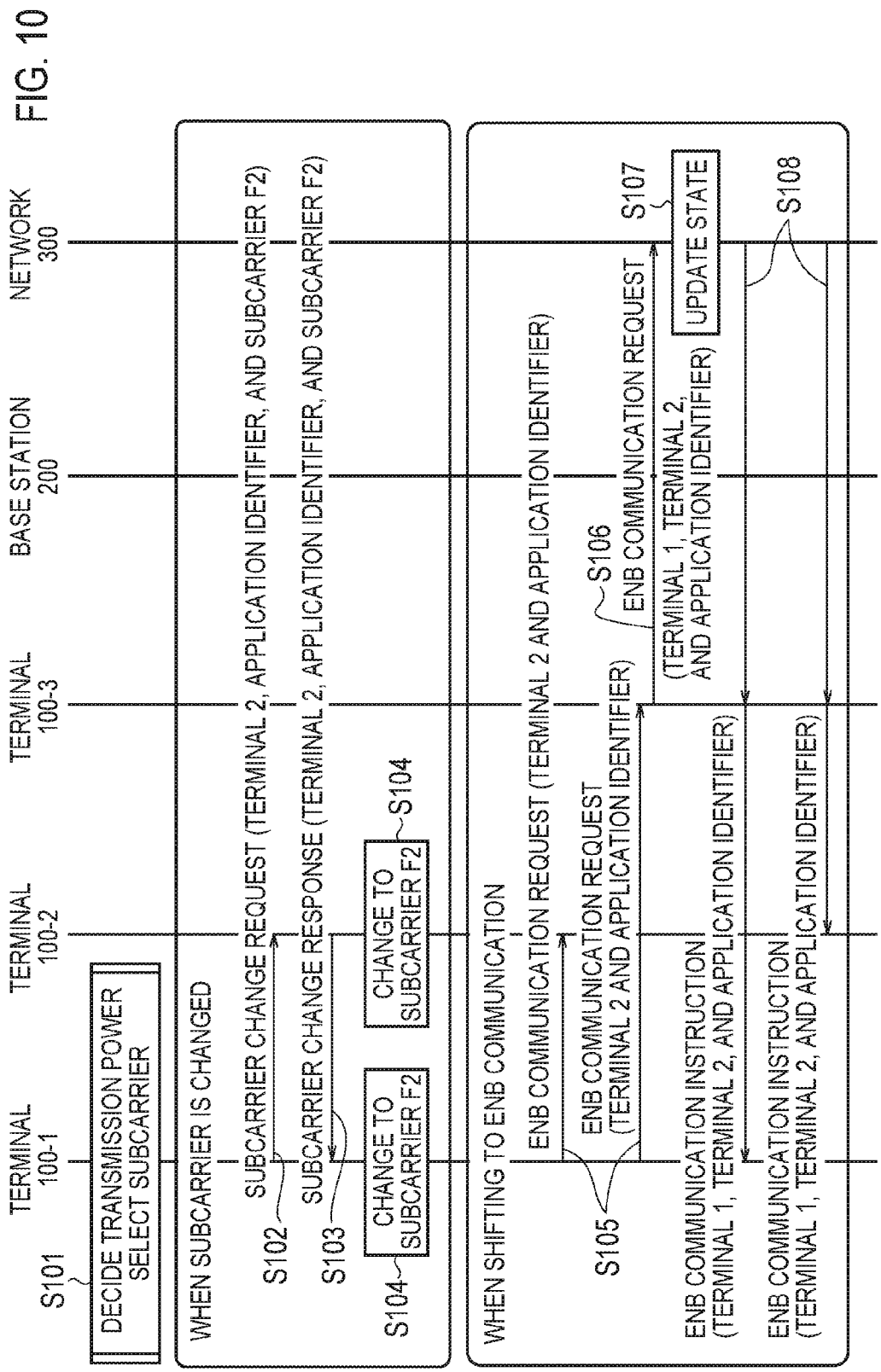
FIG. 10 is a sequence diagram showing an operation example of a mobile communication system according to a first embodiment.
Figure 11:
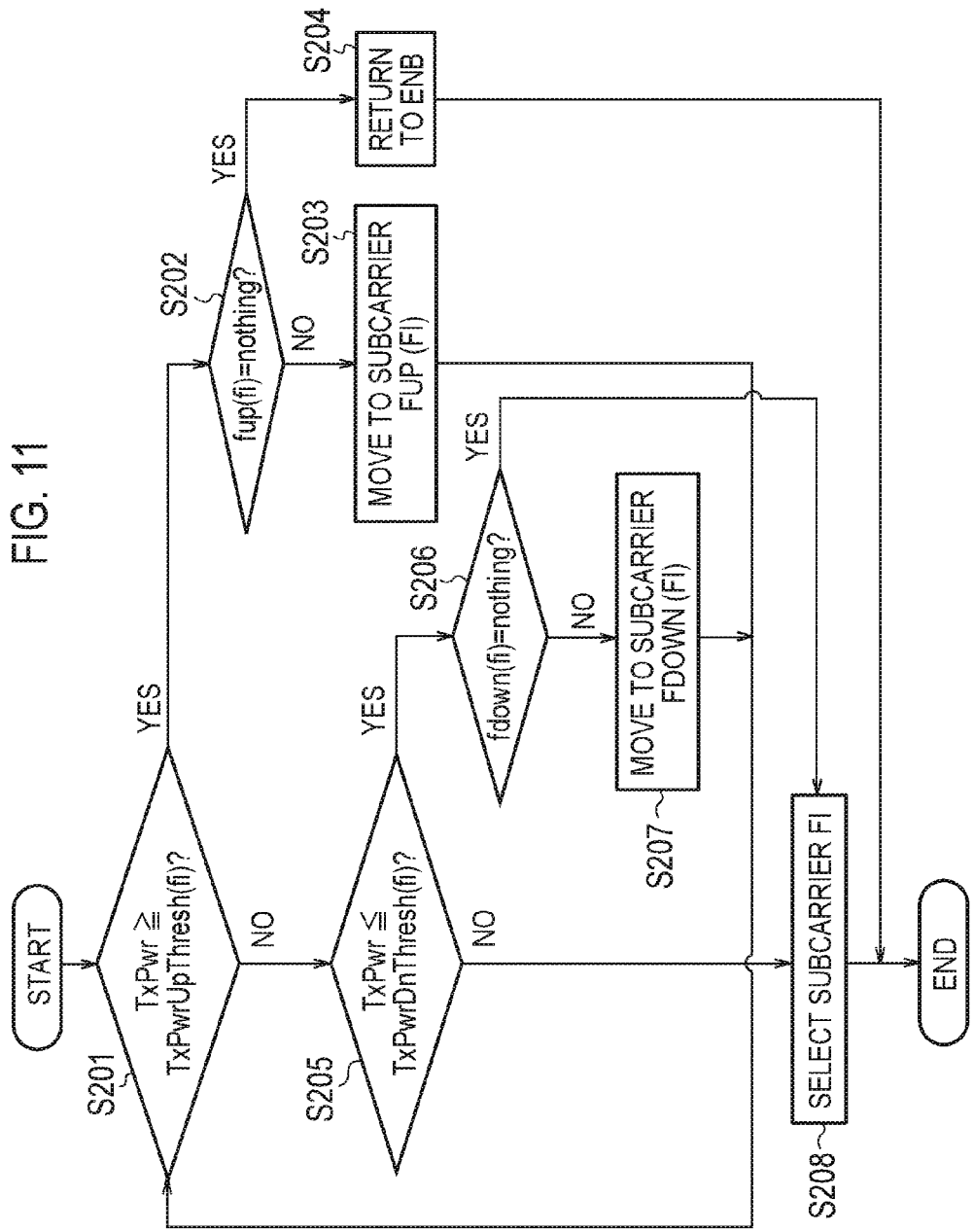
FIG. 11 is a flowchart for explaining an example of selecting a subcarrier according to the first embodiment.
Figure 12:
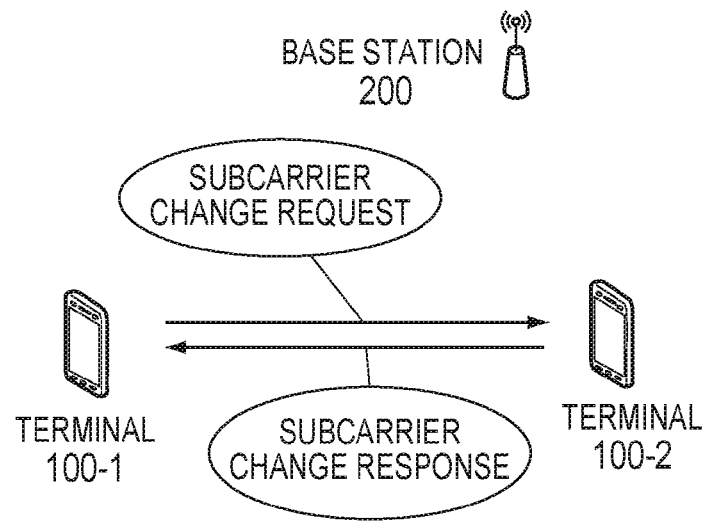
FIG. 12 is a diagram for explaining a case where the subcarrier is changed.
Figure 13:
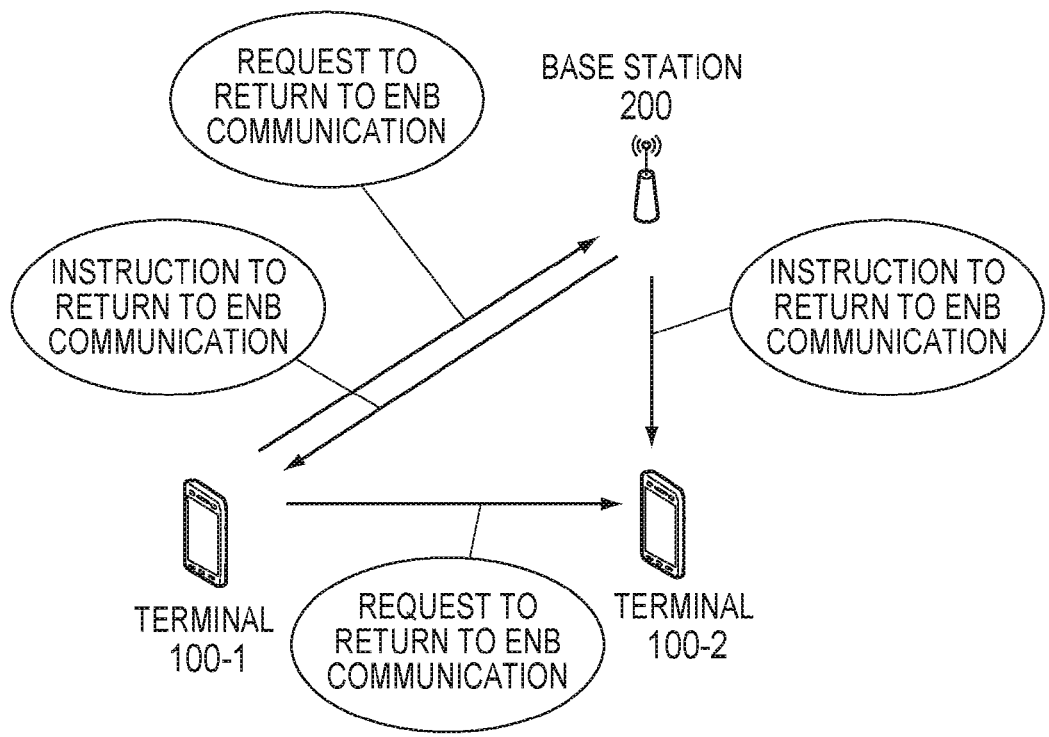
FIG. 13 is a diagram for explaining a case of shifting to communication that passes through eNB 200.

FIG. 10 is a sequence diagram showing an operation example of the mobile communication system according to the first embodiment. FIG. 11 is a flowchart for explaining an example of selecting a subcarrier according to the first embodiment. FIG. 12 is a diagram for explaining a case where the subcarrier is changed. FIG. 13 is a diagram for explaining a case of shifting to communication that passes through the eNB 200.

As shown in FIG. 10, in step 101, the UE 100-1 decides transmission power used for the D2D communication and selects a subcarrier.

Before starting the D2D communication, the UE 100-1 decides the transmission power used for the D2D communication. For example, the UE 100-1 decides the transmission power on the basis of a previously set defined value. Alternatively, the UE 100-1 decides used transmission power after change when determining to change the used transmission power to be used for the D2D communication with the UE 100-2.

A case where the UE 100-1 which performed the D2D communication with the UE 100-2 using the subcarrier f1 changes the subcarrier will be described as an example, below.

The UE 100-1 reselects a subcarrier. Specifically, the UE 100-1 selects a subcarrier used for the D2D communication from the plurality of subcarriers on the basis of the transmission power control information received from the eNB 200. By using FIG. 11, selection of a subcarrier will be described.

As shown in FIG. 11, in step 201, the UE 100-1 determines whether or not the used transmission power (TxPwr) is equal to or larger than the upper limit value (TxPwrUpThresh(fi)) associated with the subcarrier (fi). The UE 100-1 performs a process in step 202 when the used transmission power is equal to or larger than the upper limit value. On the other hand, the UE 100-1 performs a process in step 205 when the used transmission power is less than the upper limit value.

In step 202, the UE 100-1 determines whether or not a subcarrier (fup(fi)) of a change destination exists. The UE 100-1 performs a process in step 203 when the subcarrier (fup(fi)) of the change destination exists. On the other hand, the UE 100-1 performs a process in step 204 when the subcarrier (fup(fi)) of the change destination does not exist, that is, when the used transmission power is larger than any upper limit value associated with the subcarrier (fup(fi)) of the change destination.

In step 203, the UE 100-1 selects the subcarrier (fup(fi)) of the change destination, and performs a process in step 201 again.

In step 204, the UE 100-1 decides to perform communication that passes through the eNB 200.

In step 205, the UE 100-1 determines whether or not the used transmission power (TxPwr) is equal to or less than the lower limit value (TxPwrDnThresh(fi)). When the used transmission power is equal to or less than the lower limit value, the UE 100-1 performs a process in step 206. On the other hand, when the used transmission power is larger than the lower limit value, the UE 100-1 performs a process in step 208.

In step 206, the UE 100-1 determines whether or not a subcarrier (fdown(fi)) of a change destination exists. The UE 100-1 performs a process in step 207 when the subcarrier (fdown(fi)) of the change destination exists. On the other hand, when the subcarrier (fdown(fi)) of the change destination does not exist, the UE 100-1 performs a process in step 208.

In step 207, the UE 100-1 selects the subcarrier (fdown(fi)) of the change destination, and performs a process in step 201 again.

In step 208, the UE 100-1 selects the subcarrier (fi) as a subcarrier used for the D2D communication.

According to steps described above, a subcarrier in which used transmission power is included in a predetermined range of transmission power is selected. That is, the UE 100-1 selects a subcarrier from the plurality of subcarriers so that the used transmission power is within a range of the transmission power associated with the selected subcarrier.

When returning to FIG. 10, for example, the selected subcarrier is the same as a subcarrier that is being used (that is, the selected subcarrier is the subcarrier f1), the UE 100-1 performs the D2D communication as is. Accordingly, the UE 100-1 and the UE 100-2 perform the D2D communication by using the subcarrier that is being used so that the used transmission power does not exceed the maximum value of the transmission power associated with the subcarrier that is being used.

Further, in the present embodiment, the subcarrier is associated with the upper limit value and the lower limit value. Accordingly, the UE 100-1 and the UE 100-2 perform the D2D communication in a range of the transmission power associated with the f1 (a range not exceeding the upper limit value or the lower limit value).

On the other hand, when the selected subcarrier is different from the subcarrier that is being used, the UE 100-1 performs a process in step 102. It is noted that, in the present embodiment, description will be provided on the assumption that a subcarrier f2 is selected.

As shown in FIG. 10 and FIG. 12, in step 102, the UE 100-1 requests the UE 100-2 to change the subcarrier. The UE 100-2 receives the request to change the subcarrier.

The request to change the subcarrier includes information indicating an identifier indicating the UE 100-2, an application identifier indicating an application used in the D2D communication, and the selected subcarrier f2.

In step 103, the UE 100-2 sends a response of the subcarrier change to the UE 100-1. The UE 100-1 receives the response of the subcarrier change.

The response of the subcarrier change includes information indicating the identifier indicating the UE 100-2, the application identifier indicating an application used in the D2D communication, and the selected subcarrier f2.

In step 104, each of the UE 100-1 and the UE 100-2 changes the subcarrier to the subcarrier f2. Then, the D2D communication is performed with the used transmission power by using the subcarrier f2. Accordingly, the UE 100-1 and the UE 100-2 perform the D2D communication by using the subcarrier f2 so that the used transmission power does not exceed the maximum value of the transmission power associated with the subcarrier f2.

Next, description will be provided by using FIG. 10 and FIG. 13 for a case where the UE 100-1 decides to perform communication that passes through the eNB 200.

In step 105, the UE 100-1 transmits, to the UE 100-2 and the eNB 200, a request for the communication that passes through the eNB 200. The UE 100-2 and the eNB 200 receive the request for the communication that passes through the eNB 200.

The request for the communication that passes through the eNB 200 includes information indicating the identifier indicating the UE 100-2 and the application identifier indicating an application used in the D2D communication. It is noted that the request for the communication that passes through the eNB 200 includes information indicating the identifier indicating the UE 100-1.

In step 106, the eNB 200 transmits, to the network 300, the request for the communication that passes through the eNB 200. The network 300 receives the request for the communication that passes through the eNB 200. The network 300 is, for example, a core network of, such as an upper station (e.g. MME) of the eNB 200.

The request for the communication that passes through the eNB 200 transmitted by the eNB 200 includes information indicating the identifier indicating the UE 100-1, the identifier indicating the UE 100-2, and the application identifier.

In step 107, the network 300 updates states of the UE 100-1 and the UE 100-2. That is, the network 300 performs a process for the UE 100-1 and the UE 100-2 to perform the communication that passes through the eNB 200.

In step 108, the network 300 applies an instruction of the communication that passes through the eNB 200 to each of the UE 100-1 and the UE 100-2 via the eNB200. Each of the UE 100-1 and the UE 100-2 receives the instruction of the communication that passes through the eNB 200.

The instruction of the communication that passes through the eNB 200 includes information indicating the identifier indicating the UE 100-1, the identifier indicating the UE 100-2, and the application identifier.

After that, the UE 100-1 and the UE 100-2 perform the communication that passes through the eNB 200.

(Modification of First Embodiment)

Next, by using FIG. 14 and FIG. 15, a modification of the first embodiment will be explained. It is noted that description will be provided while focusing a portion different from the above-described embodiment, and description of a similar portion will be omitted, where necessary.

The modification is different from the above-described first embodiment in terms of the transmission power control information and a way of selecting a subcarrier.

(Transmission Power Control Information)

FIG. 14 is a transmission power control table showing association of a subcarrier used for the D2D communication with transmission power used for the D2D communication according to the present modification.

As shown in FIG. 14, in the present modification, each of subcarriers (f0, f1, . . . , fn) used for the D2D communication is associated with a maximum value (TxPwrMax0, TxPwrMax1, . . . , TxPwrMaxn) of the transmission power used for the D2D communication, and a minimum value (TxPwrMin0, TxPwrmin1, . . . , TxPwrminn) of the transmission power used for the D2D communication.

In the present modification, the eNB 200 transmits, to the UE 100-1 and the UE 100-2, a plurality of subcarriers (f) and information (TxPwrMax and TxPwrMin) associated with each of the plurality of subcarriers as shown in FIG. 14 as a transmission power control message of the D2D communication. It is noted that an amount of information of the transmission power control message transmitted by the eNB 200 is reduced compared to that of the above-described embodiment.

(Operation of Mobile Communication System According to Modification of First Embodiment)

Next, by using FIG. 15, an operation of a mobile communication system according to the modification of the first embodiment will be described. Other than deciding the transmission power used for the D2D communication and selecting a subcarrier in step 101 of the first embodiment, the operation is the same as that of the first embodiment, therefore, description of the same operation will be omitted.

Figure 15:
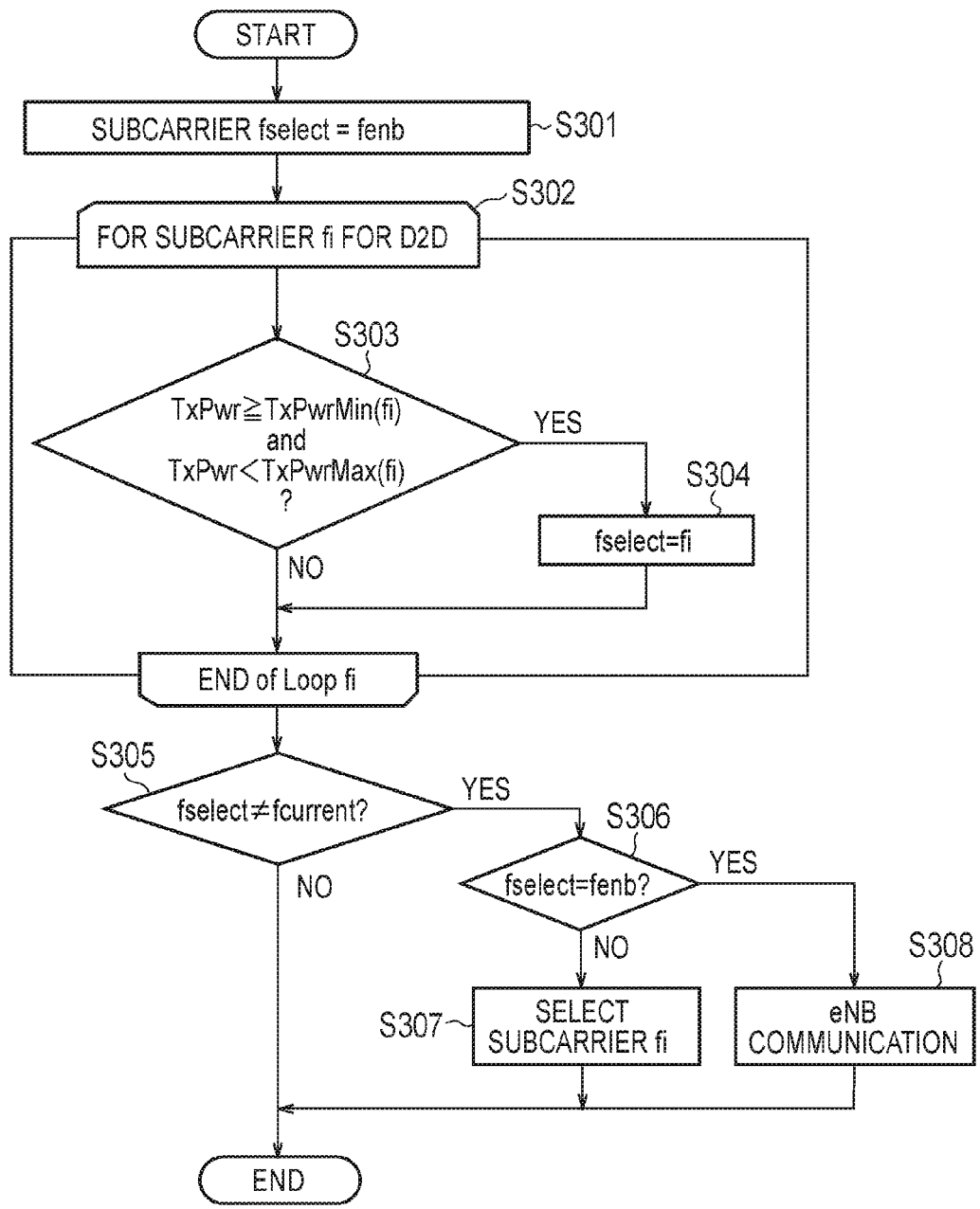
FIG. 15 is a flowchart for explaining an example of selecting a subcarrier according to a modification of the first embodiment.

FIG. 15 is a flowchart for explaining an example of selecting a subcarrier according to the modification of the first embodiment.

First, when determining to change the transmission power used for the D2D communication, the UE 100-1 decides used transmission power that is actually used for the D2D communication.

As shown in FIG. 15, in step 301, the UE 100-1 regards a subcarrier fenb used for communication that passes through the eNB 200 as a selected subcarrier fselect (a subcarrier candidate).

In step 302, the UE 100-1 selects the subcarrier fi for the D2D communication on the basis of the transmission power control information. Specifically, the UE 100-1 selects the subcarrier fi from the plurality of subcarriers (f0 to fn) indicated by the transmission power control information.

In step 303, the UE 100-1 determines whether the used transmission power (TxPwr) is equal to or larger than a lower limit value (TxPwrMin(fi)) associated with the selected subcarrier fi and smaller than an upper limit value (TxPwrMax(fi)) associated with the selected subcarrier fi. When the used transmission power is equal to or larger than the lower limit value and smaller than the upper limit value, the UE 100-1 performs a process in step 304. On the other hand, when the used transmission power is smaller than the lower limit value or the used transmission power is equal to or larger than the upper limit value, the UE 100-1 performs a process in step 302.
Specifically, the UE 100-1 selects another subcarrier different from the already selected subcarrier, then performs the process in step 303. The UE 100-1 repeats the process in step S302 until each of the plurality of subcarriers is all selected.

In step 304, the UE 100-1 regards the subcarrier fi as a selected subcarrier fselect (a subcarrier candidate), and performs the process in step 302. The UE 100-1 performs a process in step 305 after performing the process in step 302 for all subcarriers indicated by the transmission power control information.

In step 305, the UE 100-1 determines whether or not the selected subcarrier fselect (a subcarrier candidate) corresponds to a subcarrier fcurrent that is currently being used in the D2D communication. When the subcarrier fselect corresponds to the fcurrent, the UE 100-1 and the UE 100-2 perform the D2D communication with the subcarrier fcurrent as is. On the other hand, when the subcarrier fselect (a subcarrier candidate) does not correspond to the fcurrent, a process in step 306 is performed.

In step 306, the UE 100-1 determines whether the subcarrier fselect (a subcarrier candidate) selected in step 303 corresponds to the subcarrier fenb selected in step 301. That is, the UE 100-1 determines whether or not the subcarrier candidate is only the subcarrier fenb. When the subcarrier fi does not correspond to the subcarrier fenb (that is, the subcarrier candidate includes subcarrier candidate other than the subcarrier fenb), the UE 100-1 selects the subcarrier fi as a subcarrier used for the D2D communication (s307). On the other hand, when the subcarrier fi corresponds to the subcarrier fenb (that is, the subcarrier candidate is only the subcarrier fenb), it is decided to perform the communication that passes through the eNB 200 (S308).

(Summary of First Embodiment)

In the present embodiment, each of the UE 100-1 and the UE 100-2 performs the D2D communication on the basis of the transmission power associated with the subcarriers used by the UE 100-1 and the UE 100-2. Specifically, the subcarrier associated with the upper limit value that is smaller than the used transmission power to be used for the D2D communication by the UE 100-1, is selected, and the UE 100-1 performs the D2D communication by using the selected subcarrier so that the used transmission power does not exceed the upper limit value. As a result, the subcarrier associated with the upper limit value of the transmission power smaller than the used transmission power is appropriately selected, thereby making it possible to appropriately control the transmission power.

In the present embodiment, the eNB 200 transmits the transmission power control information to the UE 100-1, and the UE 100-1 selects a subcarrier to be used for the D2D communication from a plurality of subcarrier on the basis of the transmission power control information. As a result, the UE 100-1 selects the subcarrier, and thus, the eNB 200 does not need to select the subcarrier, and the load on the eNB 200 can be reduced.

In the present embodiment, the transmission power associated with each of the plurality of subcarriers indicates the range of the transmission power. The UE 100-1, on the basis of the transmission power control information, selects a radio resource used for the D2D communication from the plurality of subcarriers so that the used transmission power to be used for the D2D communication is within a range of the transmission power. Specifically, the UE 100-1 performs the D2D communication by using a predetermined subcarrier, when the used transmission power is equal to or larger than the lower limit value and smaller than the upper limit value, the UE 100-1 selects the subcarrier fi on the basis of the transmission power control information, and the UE 100-1 performs the D2D communication by using the subcarrier fi so that the used transmission power does not exceed a subcarrier upper limit value. As a result, even when the used transmission power is changed, it becomes possible to appropriately control the transmission power by appropriately selecting the subcarrier associated with the upper limit value of the transmission power that is smaller than the used transmission power.

In the present embodiment, when changing the used transmission power, the UE 100-1 reselects a subcarrier used for the D2D communication. As a result, the UE 100-1 is possible to select a subcarrier in accordance with the used transmission power after change; therefore, the UE 100-1 is capable of performing the D2D communication with an appropriate transmission power.

In the present embodiment, when determining that the used transmission power is larger than any upper limit value associated with each of subcarriers of the change destination, the UE 100-1 transmits, to the eNB 200, information requesting to perform the communication that passes through the eNB 200. As a result, when the transmission power of the D2D communication is so large as to apply interference, the communication that passes through the eNB 200 is performed, and thus, occurrence of interference can be prevented.

[Second Embodiment]

Next, by using FIG. 16 to FIG. 18, the second embodiment will be explained. It is noted that description will be provided while focusing a portion different from the above-described embodiment, and description of a similar portion will be omitted, where necessary.

The second embodiment is different from the above-described first embodiment in that each of the plurality of subcarriers is associated with the upper limit value of the transmission power so that the maximum value (TxPwrMax) of the transmission power becomes larger according to the distance from the eNB 200.

(Transmission Power Control Information)

FIG. 16 is a transmission power control table (transmission power control information) showing association of a subcarrier used for the D2D communication with transmission power used for the D2D communication according to the second embodiment.

As shown in FIG. 16, the transmission power control information includes the information indicating the distance from the eNB 200, in addition to the information of the plurality of radio resources (the plurality of subcarriers) used for the D2D communication and of the transmission power associated with each of the plurality of radio resources. In the present embodiment, the information indicating the distance from the eNB 200 is the information indicating the bath loss between the eNB 200 and the UE 100. Therefore, the transmission power is associated with the distance from the base station.

Specifically, each of the subcarriers (f0, f1, . . . , fn) used for the D2D communication is, plus the transmission power (TxPwrMax, TxPwrUpThresh, TxPwrDnThresh), associated with an upper limit value (PLup0, PLup1, . . . , PLupn) of path loss and a lower limit value (PLdn0, PLdn1, . . . , PLdnn) of the path loss. Respective upper limit values (PLup) of the path loss are values different from each other. Further, respective lower limit values (PLdn) of the path loss are values different from each other.

Further, regarding each of the subcarriers (f0, f1, . . . , fn) used for the D2D communication, the subcarrier is associated with the upper limit value of the transmission power so that the upper limit value of the transmission power becomes larger according to a distance from the eNB 200 (that is, the distance between the eNB 200 and the UE 100).

The eNB 200 transmits, to the UE 100-1 and the UE 100-2, the plurality of subcarriers (f) and information (TxPwrMax, TxPwrUpThresh, TxPwrDnThresh, fup, fdown, PLup, and PLdn) associated with each of the plurality of subcarriers as shown in FIG. 16 as a transmission power control message of the D2D communication. That is, the eNB 200 transmits, to the UE 100-1 and the UE 100-2, information indicating the plurality of subcarriers, upper limit values of the transmission power associated with the plurality of subcarriers, and path loss associated with the plurality of subcarriers as a transmission power control message of the D2D communication.

(Operation of Mobile Communication System According to Second Embodiment)

Next, by using FIG. 17, an operation of a mobile communication system according to the second embodiment will be described. Other than deciding the transmission power used for the D2D communication and selecting a subcarrier in step 101 of the first embodiment, the operation is the same as that of the first embodiment, therefore, description of the same operation will be omitted. FIG. 17 is a flowchart for explaining an example of selecting a subcarrier according to the second embodiment.

Figure 17:
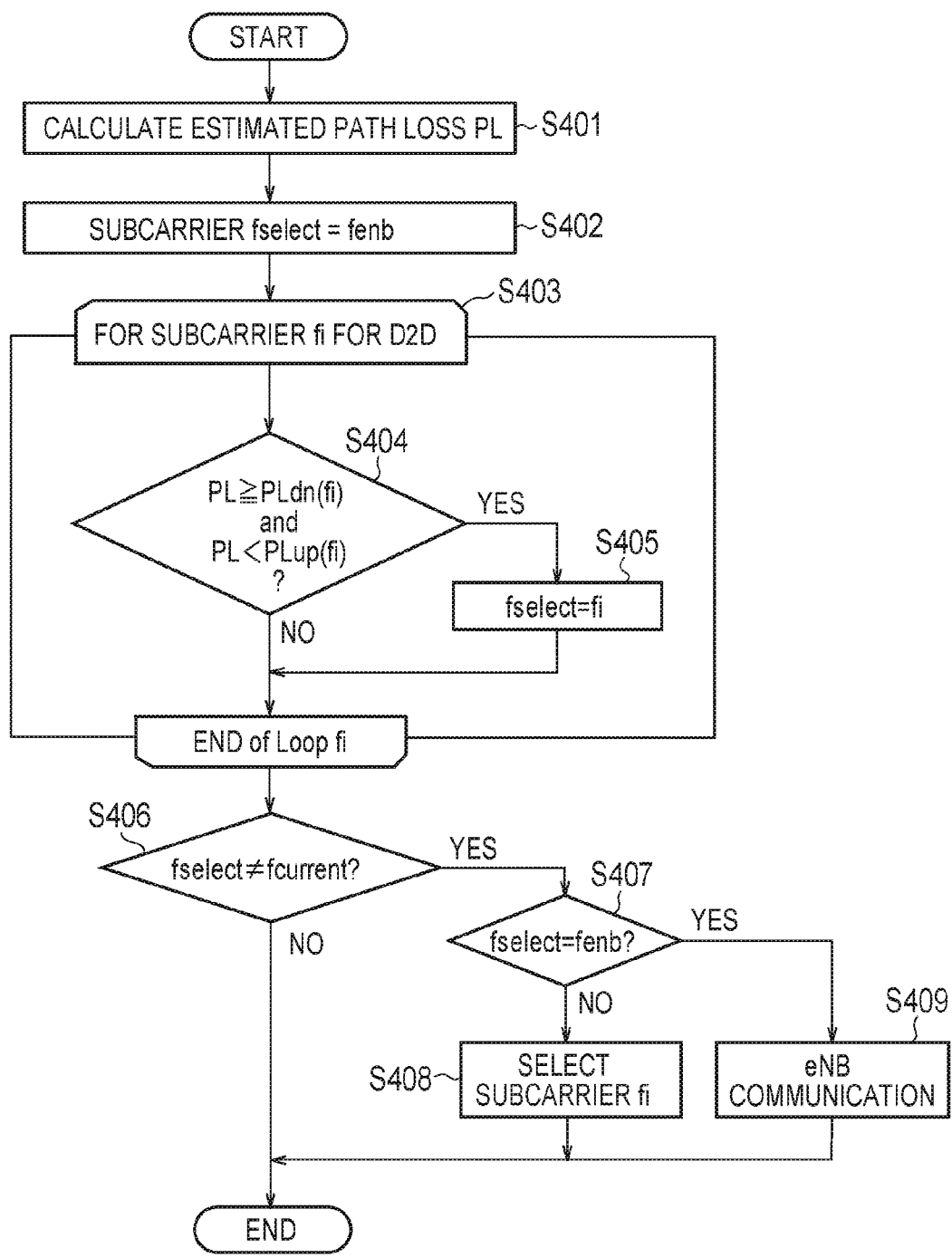
FIG. 17 is a flowchart for explaining an example of selecting a subcarrier according to the second embodiment.
Figure 18:
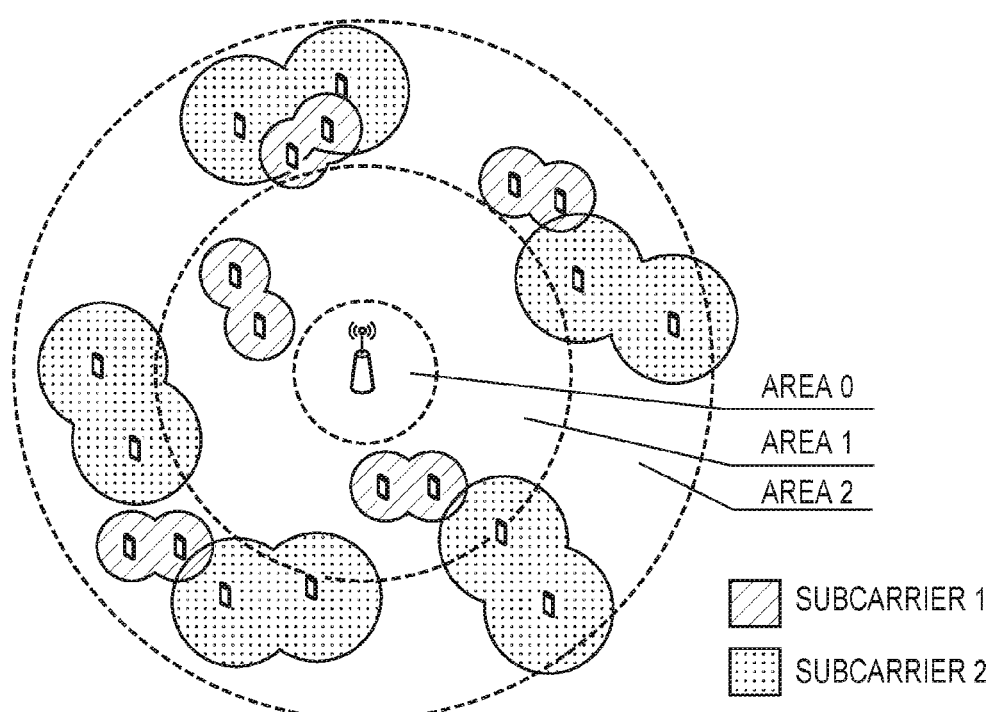
FIG. 18 is a diagram for explaining a distance between a base station and a user terminal and magnitude of transmission power according to the second embodiment.

First, as shown in FIG. 17, in step 401, the UE 100-1 estimates path loss of a reference signal transmitted from the eNB 200. For example, the UE 100-1 can estimate the path loss by difference between information on transmission power of the reference signal of the eNB 200 included in the reference signal transmitted from the eNB 200 and received power of the reference signal received by the UE 100-1.

In step 402, the UE 100-1 regards the subcarrier fenb used for the communication that passes through the eNB 200 as a selected subcarrier fselect (a subcarrier candidate).

In step 403, the UE 100-1 selects the subcarrier fi for the D2D communication on the basis of the transmission power control information. Specifically, the UE 100-1 selects the subcarrier fi from the plurality of subcarriers (f0 to fn) indicated by the transmission power control information.

In step 404, the UE 100-1 determines whether the estimated path loss (PL) estimated in step 401 is equal to or larger than a lower limit value (PLdn(fi)) of the path loss associated with the selected subcarrier fi and smaller than an upper limit value (PLup(fi)) of the path loss associated with the selected subcarrier fi. When the estimated path loss is equal to or larger than the lower limit value and smaller than the upper limit value, the UE 100-1 performs a process in step 405. On the other hand, when the used transmission power is smaller than the lower limit value or the used transmission power is equal to or larger than the upper limit value, the UE 100-1 performs a process in step 403. Specifically, the UE 100-1 selects another subcarrier different from the already selected subcarrier, then performs the process in step 404. The UE 100-1 repeats the process in step S403 until each of the plurality of subcarriers is all selected.

In step S405, the UE 100-1 regards the subcarrier fi as a selected subcarrier fselect (a subcarrier candidate), and performs the process in step 403. The UE 100-1 performs a process in step 406 after performing the process in step 403 for all subcarriers indicated by the transmission power control information.

Steps 406 to 409 correspond to steps 305 to 308 of the modification in the first embodiment in which the transmission power is replaced with the path loss.

(Summary of Second Embodiment)

In the present embodiment, the subcarrier is associated with the upper limit value of the transmission power so that the upper limit value of the transmission power becomes larger according to the distance from the eNB 200. The UE 100 selects a subcarrier from the plurality of subcarriers in accordance with the distance from the eNB 200 to the UE 100. As a result, when the distance between the eNB 200 and the UE 100 is long, (for example, in FIG. 18, when the UE 100-1 exists in an area 2), a subcarrier with a large upper limit value of the transmission power (a subcarrier 2 in FIG. 18) is used, and the D2D communication can be performed in a large area. On the other hand, when the distance between the eNB 200 and the UE 100 is short, (for example, in FIG. 18, when the UE 100-1 exists in an area 1 or the area 2), a subcarrier with a small upper limit value of the transmission power (a subcarrier 1 in FIG. 18) is used, and the interference to the eNB 200 can be prevented.

In the present embodiment, the information indicating the distance from the eNB 200 is the information indicating the path loss between the eNB 200 and the UE 100. Thus, each of the plurality of subcarriers is associated with the path loss of the reference signal transmitted from the eNB 200, the eNB 200 transmits, to the UE 100-1 and the UE 100-2, information indicating the plurality of subcarriers, the upper limit values of the transmission power associated with the plurality of subcarriers, and path loss associated with the plurality of subcarriers, the UE 100-1 calculates the path loss between the eNB 200 and the UE 100-1, and the UE 100-1 selects a subcarrier on the basis of the power control information and the path loss. As a result, the UE 100-1 selects the subcarrier associated with the upper limit value of the transmission power while considering the positional relation between the UE 100-1 and the eNB 200, and thus, the eNB 200 does not need to select the subcarrier and the interference to the eNB 200 can be prevented.

[Third Embodiment]

Next, by using FIG. 19, the third embodiment will be explained. It is noted that description will be provided while focusing a portion different from the above-described embodiment, and description of a similar portion will be omitted, where necessary.

In the above-described second embodiment, each of the plurality of subcarriers is associated with the upper limit value of the transmission power according to the distance from the eNB 200, however, in the present embodiment, each of the plurality of subcarriers is associated with the upper limit value of the transmission power according to a relation between the D2D frequency band used for the D2D communication and a cellular frequency band used for the cellular communication.

(Transmission Power Control Information)

Figure 19:
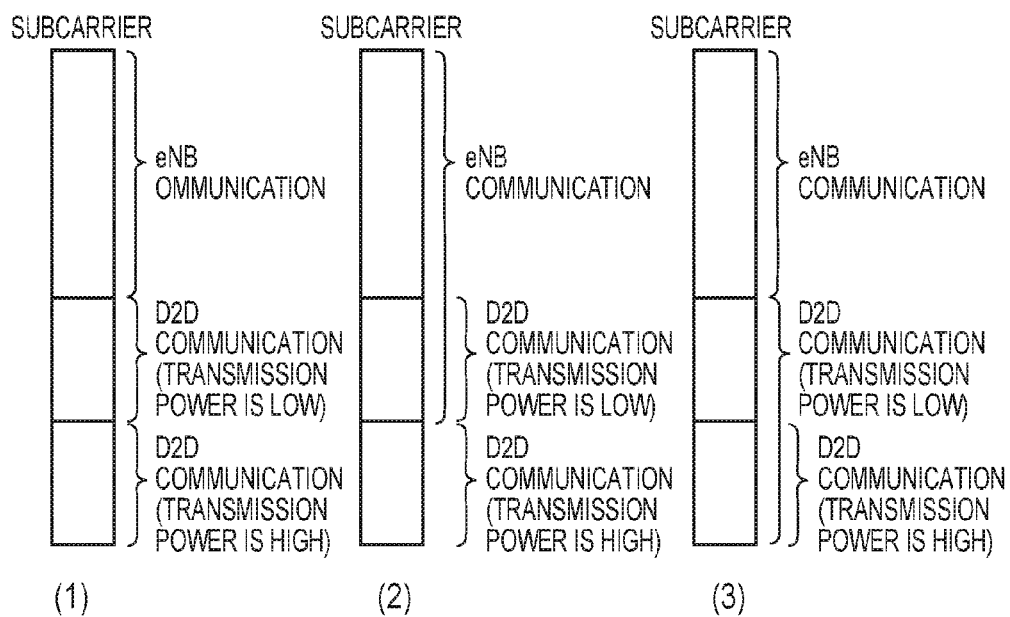
FIG. 19 is a diagram for explaining association of a subcarrier used for the D2D communication with transmission power used for the D2D communication according to a third embodiment.

FIG. 19 is a diagram for explaining association of a subcarrier used for the D2D communication with transmission power used for the D2D communication according to the third embodiment.

In an example shown in FIG. 19 (1), a frequency band is divided into a frequency band used for the cellular communication and a frequency band used for the D2D communication. The frequency band used for the D2D communication is divided into a low D2D frequency band associated with low transmission power in which an upper limit value of the transmission power is equal to or less than a predetermined value and a high D2D frequency band associated with high transmission power in which a upper limit value of the transmission power is larger than the predetermined value. The low D2D frequency band is adjacent to the frequency band used for the cellular communication. On the other hand, the high D2D frequency band is distant from the cellular frequency band. In an example shown in FIG. 19 (1), the frequency band used for the cellular communication is not overlapped with the frequency band used for the D2D communication.

In an example shown in FIG. 19 (2), a frequency band used for the cellular communication is partially overlapped with a frequency band used for the D2D communication. A frequency band used for the cellular communication and the D2D communication is associated with the low transmission power in which an upper limit value of the transmission power is equal to or less than the predetermined value. A frequency band used for only the D2D communication is associated with the high transmission power in which an upper limit value of the transmission power is larger than the predetermined value. A frequency band used for only the cellular communication is adjacent to the frequency band used for the cellular communication and the D2D communication (the low D2D frequency band).

In an example shown in FIG. 19 (3), a frequency band used for the cellular communication is partially overlapped with a frequency band used for the D2D communication. A frequency band used for the cellular communication and the D2D communication is associated with the low transmission power in which transmission power is equal to or less than the predetermined value. A frequency band used for only the D2D communication is associated with the high transmission power in which transmission power is larger than the predetermined value and the low transmission power in which transmission power is smaller than the predetermined value. A frequency band used for only the cellular communication is adjacent to the frequency band used for the cellular communication and the D2D communication (the low D2D frequency band).

(Summary of Third Embodiment)

According to the present embodiment, the frequency band for the D2D communication that is adjacent to the frequency band used only for the cellular communication is associated with the upper limit value of the transmission power that is equal to or less than the predetermined value. That is, the low D2D frequency band is provided adjacent to the frequency band used only for the cellular communication. On the other hand, the high D2D frequency band is provided distant from the frequency band used only for the cellular communication. As a result, the neighboring frequency band for the D2D communication that is adjacent to the frequency band used for only the cellular communication is associated with the low transmission power for the D2D communication. Accordingly, it is possible to utilize the frequency band for the cellular communication and the frequency band for the D2D communication not only in a completely separated state, but also in a partially shared state. That is, by considering the transmission power, the interference can be prevented even in a state where the frequency band for the cellular communication and the frequency band for the D2D communication are partially shared, and thus, it is possible to realize a system operation with good frequency use efficiency.

[Other Embodiments]

Thus, the present disclosure has been described with the embodiments. However, it should not be understood that those descriptions and drawings constituting a part of this disclosure limit the present disclosure. From this disclosure, a variety of alternate embodiments, examples, and applicable techniques will become apparent to one skilled in the art.

In the above-described embodiment, the used transmission power to be used for the D2D communication is described, however, the used transmission power to be used for the process of discovering is also applicable.

Further, in the above-described first embodiment, a case where the subcarrier is changed is described as an example, however, the present disclosure is not limited thereto. The UE 100-1 is capable of selecting a subcarrier in much the same way as the above-described first and second embodiments, when selecting a subcarrier used for the D2D communication from the plurality of subcarriers before starting the D2D communication.

Further, in the above-described embodiment, the UE 100 selects a subcarrier, however, the present disclosure is not limited thereto. For example, the network 300 may select the subcarrier used for the D2D communication.

For example, the UE 100-1 transmits information of the used transmission power that is used to the network 300 via the eNB 200. The network 300 can transmit, to the UE 100-1 via the eNB 200, information indicating a subcarrier in which the used transmission power does not exceed the upper limit value on the basis of received information.

Further, in the above-described second embodiment, regarding each of the subcarriers used for the D2D communication, the subcarrier is associated with the upper limit value of the transmission power so that the upper limit value of the transmission power becomes larger according to the distance from the eNB 200, however, the present disclosure is not limited thereto.

Figure 20:
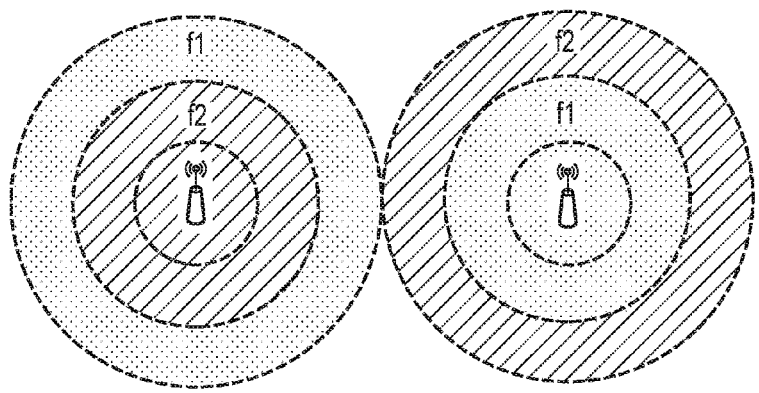
FIG. 20 is a diagram for explaining a relation between a subcarrier used for the D2D communication and an area of a cell.

For example, in FIG. 20, in a first base station 200-1 that manages a first cell 250-1, a frequency band f1 for the D2D communication is used at the periphery side of the first cell 250-1, and a frequency band f2 for the D2D communication is used at the center side of the first cell 250-1. On the other hand, in a second base station 200-2, adjacent to the first base station 250-1, that manages a second cell 250-2, the frequency band f2 for the D2D communication is used at the periphery side of the second cell 250-2, and the frequency band f1 for the D2D communication is used at the center side of the second cell 250-2. That is, the frequency band for the D2D communication used in the periphery of the first cell is different from the frequency band for the D2D communication used in the periphery of the second cell. Therefore, out of the plurality of radio resources (the plurality of frequency bands), the radio resource (the frequency band f1) that is available at the edge of the first cell 250-1 is different from the radio resource (the frequency band f2) that is available at the edge of a neighboring cell, the second cell 250-2. As a result, it is possible to prevent occurrence of interference between a user terminal group that is performing the D2D communication in the first cell 250-1 and a user terminal group that is performing the D2D communication in the second cell 250-2.

Further, in each of the above-described embodiments, the plurality of radio resources are the plurality of frequency bands (specifically, subcarriers) divided in the frequency direction, however, for example, the plurality of radio resources may be the plurality of radio resources divided in a time axis direction.

Moreover, in the above-described second embodiment, the information indicating the distance from the eNB 200 is the path loss between the eNB 200 and the UE 100, however, the present disclosure is not limited thereto. The information indicating the distance from the eNB 200, for example, may be information indicating the physical distance such as [m] and [km] from the eNB 200. In this case, on the basis of the location information of the UE 100-1 and the location information of the eNB 200, the UE 100-1 is capable of selecting a subcarrier from the plurality of subcarriers according to the calculated distance from the eNB 200.

In addition, in the above-described first and second embodiments, the UE 100-1 selects a subcarrier on the basis of the transmission power control information from the eNB 200, however, the present disclosure is not limited thereto. The UE 100-1 may select a subcarrier on the basis of setting information that is previously set in the UE 100-1. For example, the UE 100-1 is capable of selecting a subcarrier on the basis of the setting information when the UE 100-1 does not exist in a cell managed by the eNB 200.

Needless to say, each of the above-described embodiments and modifications may be combined, where necessary.

The above-described embodiment has described an example in which the present disclosure is applied to the LTE system. However, the present disclosure may also be applied to systems other than the LTE system, as well as the LTE system.

In addition, the entire content of U.S. Provisional Application No. 61/766,505 (filed on Feb. 19, 2013) is incorporated in the present specification by reference.

INDUSTRIAL APPLICABILITY

As described above, the mobile communication system, the base station, the user terminal according to the present disclosure are able to appropriately controlling transmission power used for a process of discovering a partner terminal in D2D communication or for the D2D communication, thus they are useful for a mobile communication field.

The invention claimed is:
1. A user terminal, comprising
a controller;
a receiver configured to receive a System Information Block (SIB) from a base station; and
a transmitter configured to transmit a discovery signal for discovering another user terminal in a discovery procedure, wherein the SIB includes a plurality of information sets used to transmit the discovery signal in the discovery procedure,
each information set of the plurality of information sets includes radio resources used for a transmission of the discovery signal, power information for controlling transmission power of the discovery signal, and a threshold value associated with the radio resources, wherein the threshold value is an upper limit value and a lower limit value compared with a predetermined value calculated by use of a received power of a reference signal received from the base station,
the receiver is configured to receive the reference signal from the base station,
the controller is configured to:
compare the predetermined value with the threshold value, and
select an information set from among the plurality of information sets, in response to the predetermined value being between the upper limit value and the lower limit value included in the selected information, and
the transmitter is configured to directly transmit the discovery signal to the another user terminal with transmission power based on power information included in the selected information set by use of radio resources included in the selected information set.

2. A processor communicatively coupled to a memory, the processor for controlling a user terminal and configured to:
perform a process of receiving a System Information Block (SIB) from a base station; and
perform a process of transmitting a discovery signal for discovering another user terminal in a discovery procedure, wherein
the SIB includes a plurality of information sets used to transmit the discovery signal in the discovery procedure,
each information set of the plurality of information sets includes radio resources used for a transmission of the discovery signal, power information for controlling transmission power of the discovery signal, and a threshold value associated with the radio resources, wherein the threshold value is an upper limit value and a lower limit value compared with a predetermined value calculated by use of a received power of a reference signal received from the base station,
the processor is further configured to:
receive the reference signal from the base station,
compare the predetermined value with the threshold value, and
select an information set from among the plurality of information sets, in response to the predetermined value being between the upper limit value and the lower limit value included in the selected information, and
the processor is configured to perform a process of directly transmitting the discovery signal to the another user terminal with transmission power based on power information included in the selected information set by use of radio resources included in the selected information set.

3. A base station, comprising:
a controller configured to include a plurality of information sets into a System Information Brock (SIB), wherein the plurality of information sets are used to transmit a discovery signal in a discovery procedure; and a transmitter configured to transmit the SIB, wherein
each information set of the plurality of information sets includes radio resources used for a transmission of the discovery signal, power information for controlling transmission power of the discovery signal, and a threshold value associated with the radio resources, wherein the threshold value is an upper limit value and a lower limit value compared with a predetermined value calculated by use of a received power of a reference signal received from the base station in the user terminal, and
the threshold value is used for a comparison of the threshold value with the predetermined value in order for the user terminal to select an information set from among the plurality of information sets in response to the predetermined value being between the upper limit value and the lower limit value included in the selected information.

4. A processor communicatively coupled to a memory, the processor configured for controlling a base station and configured to:
perform a process of including a plurality of information sets into a System Information Block (SIB), the plurality of information sets being used to transmit a discovery signal in a discovery procedure; and
perform a process of transmitting the SIB, wherein
each information set of the plurality of information sets includes radio resources used for a transmission of the discovery signal, power information for controlling transmission power of the discovery signal, and a threshold value associated with the radio resources, wherein the threshold value is an upper limit value and a lower limit value compared with a predetermined value calculated by use of a received power of a reference signal received from the base station the user terminal, and
the threshold value is used for a comparison of the threshold value with the predetermined value in order for the user terminal to select an information set from among the plurality of information sets in response to the predetermined value being between the upper limit value and the lower limit value included in the selected information.

* * * * *